US006347375B1

(12) United States Patent
Reinert et al.

(10) Patent No.: US 6,347,375 B1
(45) Date of Patent: Feb. 12, 2002

(54) APPARATUS AND METHOD FOR REMOTE VIRUS DIAGNOSIS AND REPAIR

(75) Inventors: James Richard Reinert, Champlin; Gary Scott Stevens, Chanhassen; Michael William Rogers, Minnetonka, all of MN (US)

(73) Assignee: Ontrack Data International, INC, Eden Prairie, MN (US)

(*) Notice: Subject to any disclaimer, the term of this patent is extended or adjusted under 35 U.S.C. 154(b) by 0 days.

(21) Appl. No.: 09/112,032

(22) Filed: Jul. 8, 1998

(51) Int. Cl.$^7$ ............................................. G06F 11/00
(52) U.S. Cl. ..................................................... 713/200
(58) Field of Search ................................. 713/200, 201

(56) References Cited

U.S. PATENT DOCUMENTS

| | | | |
|---|---|---|---|
| 5,398,196 A | | 3/1995 | Chambers |
| 5,475,839 A | | 12/1995 | Watson et al. |
| 5,485,575 A | | 1/1996 | Chess et al. |
| 5,537,540 A | * | 7/1996 | Miller ......................... 713/200 |
| 5,559,960 A | * | 9/1996 | Lettvin ......................... 713/200 |
| 5,649,095 A | | 7/1997 | Cozza |
| 5,684,875 A | | 11/1997 | Ellenberger |
| 5,960,170 A | * | 9/1999 | Chen ........................... 713/201 |

OTHER PUBLICATIONS

Symantec Corporation: Press Release "Norton Utilies for Windows NT 4.0" Feb. 6, 1997.*
Symantec Corporation: Press Centre "File Recovery Easy for Norton Utilies Users Hit by Worm.Explore.Zip" Jun. 17, 1999.*

* cited by examiner

Primary Examiner—Robert Beausoleil
Assistant Examiner—Bryce P. Bonzo
(74) Attorney, Agent, or Firm—Merchant & Gould PC (57) ABSTRACT

A method of remotely scanning and repairing viruses on a local computer having a normal operating system, the method comprising the steps of loading into memory of the local computer, a bootable virus utility operating program from a storage medium, the bootable virus utility operating program being operated locally by the local computer and independently of the normal operating system; and establishing communications between the local computer and a remote computer through operation of the virus utility operating program by the local computer. Wherein the virus utility operating program includes a virus scanning program. Further including the step of querying the user and monitoring the local computer display for user information regarding virus scanning and repair utility options through the operation of the remote computer and executing virus scanning and repair utility programs at the local computer after executing a remote data recovery function.

41 Claims, 3 Drawing Sheets

APPARATUS AND METHOD FOR REMOTE VIRUS DIAGNOSIS AND REPAIR

TECHNICAL FIELD OF THE INVENTION

The present invention relates, in general, to an apparatus and/or method for remotely scanning and repairing viral infections on a local computer data storage devices and/or media.

BACKGROUND OF THE INVENTION

The value of a computing system to a user, especially a corporation, professional association or government entity is not limited to the actual cost of the hardware and software components which comprise that system, but also includes the value of the data represented within that system. Indeed, it is quite common that the accounting data, intellectual property, design and manufacturing information, and/or other records which are stored on computing systems in personal and business use are ultimately of a value which far exceeds the value of the computing equipment itself.

Loss of the ability to access data on a computer storage device, such as a disk drive, can occur, often as a result of acts of sabotage by the unauthorized activity of a computer virus. In the vast majority of cases, the user is unaware that a computer virus has infected the computer system. This can result in the virus spreading, and going undetected, until an event occurs, such as the catastrophic loss of valuable computer data or the loss of accessibility to the data by the normal operating environment.

A computer virus is almost impossible to define because new types are continually developed that do not meet or conform to specific rules. These new types of viruses are being developed and spread at alarming rates. Generally, a computer virus is a clandestine program written specifically to attach itself parasitically to existing programs, and subsequently alter the existing program. A broader definition of a virus is simply a computer program that is able to spawn replication of itself. Nearly all viruses posses at least four identifiable attributes such as replication, protection, trigger, and payload.

The replication mechanism of a virus consists simply of computer executable instructions, or code, that enables the virus to attach itself to another, often legitimate program or list of normal executable instructions and replicate itself. To replicate itself, a virus may seek out uninfected executable files in the computer system, and append a representation of itself to that file; or a virus may remain in memory and target specific events such as the execution of certain files; or there also exists the possibility of even more complex mechanisms for the virus to accomplish its replication task, such as a specific date or event occurring independently of an executable file.

The protection mechanism is another attribute of a virus. It has the ability to attempt to hide from detection, thereby making it more difficult for virus detection software to find them. Some of the more complex viruses employ sophisticated stealth techniques. The more advanced of these are known as polymorphic viruses and actually mutate each time they replicate in order to hide their existence. The reason for this is that authors of viruses are aware of the virus scanning software techniques for identifying and locating viruses. Therefore, the authors employ sophisticated encryption techniques to make the viruses undetectable. One example is the use of Simulated Metamorphic Encryption Engines to add stealth to the virus, thus prohibiting its detection and allowing the virus to change its main body of code during each replication.

Yet another attribute of computer viruses is their ability to begin duplicating themselves on the occurrence of a specific event, known as a trigger. The trigger may be one or a combination of many events including booting the computer one or several times, executing a specific program a certain number of times, simply executing a particular program, at a specific time read from the computer's clock, or at a specific date. It seems that the list of events is only limited to the imagination of the author of the virus.

The payload is the final and most dangerous of all attributes of viruses because of the destruction they cause at the time a trigger event occurs. In most cases, the virus simply replicates itself, however the cruelest and most damaging viruses overwrite key files on a local computer hard disk drive or corrupt the entire computer system or network, leading to loss of normal operating programs and valuable data.

There are generally three types of viruses, the boot sector infectors, traditional file or document infectors, and macro infectors. However, newer viruses are being developed every day at rates of 200 per month adding to the population of roughly 7,500 viruses that are known to exist. In fact, rouge programmers have developed, and are making widely available, a number of virus authoring application programs easing the creation process on behalf of the author. In addition, thousands of viruses are being sold and made readily available to virus developers on CD-ROMs.

Subsequently, because of the proliferation of computer viruses, there exists today companies that specialize in the manufacture of virus detection and eradication software, commonly referred to as anti-virus software. Examples of anti-virus software are Network Associate's VirusScan and WebScan, Symantec's Norton Anti-Virus, SecureWay by IBM, ThunderByte Anti-Virus from ThunderByte, and Vet anti-virus from Cybec Pty Ltd. A common medium for Anti-Virus software is a floppy computer diskette, however, today CD-ROM is likely the most common medium. Recently, the anti-virus software vendors have made their products available on Internet. The difficulty with these mediums is the need to constantly update the virus signature files to scan and repair the latest viruses infiltrating the computer community. This may lead to significant expense for a corporation or private individual in terms of anti-virus software maintenance and management cost.

Today, with the availability of virus development software tool kits, the increase in general computer usage, and the increasing popularity of Internet, new, cruel, devastating and variant types of viruses are being spread quickly and efficiently, thus widening the gap between the set of known viruses and newly developed viruses in circulation that are yet undetected. An example of the spreading efficiency that could be obtained is illustrated by the spread of the Internet Worm in November of 1988. In a matter of hours, the Worm infected hundreds, and probably thousands, of computers on the Internet, leading to substantial costs of eradication and general loss of productivity. This reinforces the need to constantly maintain up-to-date anti-virus software to scan and detect the latest viruses—again leading to added cost of doing business and purchasing obsolete protection.

Further, if a computer cannot boot, as a result of a virus or other problem, it cannot access Anti-Virus software or virus signature files that reside on the hard disk drive or that may be available via Internet.

Still, even if a computer is able to boot, it may not have access to virus scanning and repair software or the latest signature files, e. g. a laptop computer. It is appreciated that it is a burdonsome task to constantly update the virus scanning and repair software with the latest virus signature files. It is likely the case that a computer may never have an up-to-date virus signature file on the computer system. In fact, anti-virus software is likely to be obsolete at the time it is purchased and used because of the proliferation of new viruses in the computer community. New viruses are created and spread well before anti-virus scanning and repair programs can be developed and distributed to users.

Thus, if the computer will not boot, the computer user needs an independent boot mechanism for scanning and repairing viruses. Some virus scanning software packages do provide a boot disk. Still, other versions of software available on CD-ROM may require the user to build a diskette boot utility. Of course failure to build a boot utility will most likely leave the user unable to boot up the computer. The problem is compounded in the case involving a laptop, especially if the user is traveling and does not have anti-virus software conveniently available.

Also, it is appreciated by those skilled in the art that deleted files, infected with viruses, may exist in the memory or storage medium of a computer. These "deleted" files are generally overlooked by conventional virus scanning and repair software. Thus, it is likely that a computer system would become newly infected with a virus upon "undeleting" a virus infected deleted file.

Accordingly, there is a particular need in the art to supply up-to-date computer virus scanning and repairing utilities to a user that are available in real time and that are accessible even in the event that a local computer is unable to boot or when the normal operating system is not necessarily loadable or dependable because of damage done to the computer system by a virus or other catastrophic event.

The present invention solves these problems and provides a method and apparatus for up-to-date remote virus scanning, diagnostic services and rectification of lost data especially in cases in which a local computer is inaccessible by the normal operating environment.

SUMMARY OF THE INVENTION

To overcome the limitations in the prior art described above, and to overcome other limitations that will become apparent upon reading and understanding the present specification, the present invention discloses a method and apparatus for providing up-to-date virus scanning of a local computer by a remote computer comprising those situations where the normal operating system of the local computer is not operable.

In one embodiment the present invention discloses a method of remotely scanning for and repairing viruses on a local computer having a normal operating system, the method comprising the operations of loading into a memory of the local computer, a bootable virus utility operating program from a storage medium, the bootable virus utility operating program being operated locally by the local computer and independently of the normal operating system; and establishing communications between the local computer and a remote computer through the operation of the virus utility operating program by the local computer.

Further in one embodiment, the operation of the virus utility operating program further includes the operation of executing a virus scanning program.

Still in one embodiment, the operation of the virus utility operating program further includes the operation of executing a virus repair program.

Further in one embodiment, the operation of the local computer is controlled by the remote computer.

Still in one embodiment, the operation of the remote computer further includes the operation of querying a local computer user for information through the operation of the remote computer.

Yet in one embodiment, the operation of the remote computer further includes the operations of downloading a remote data recovery program from the remote computer to the memory of the local computer and executing the data recovery program in the memory of the local computer.

Yet in one embodiment, the operation of the remote computer further includes the operation of downloading a virus scanning utility program from the remote computer to the local computer.

Further in one embodiment, the operation of the remote computer further includes the operation of downloading a virus scanning utility program from the remote computer to the memory of the local computer.

Still in one embodiment, the operation of the remote computer further includes the operation of executing the virus scanning utility program at the local computer.

Further in one embodiment, the operation of executing the virus scanning utility program at the local computer further includes the operation of scanning deleted files located at the local computer.

Further in one embodiment, the operation of the remote computer further includes the operation of downloading the virus scanning utility program from the remote computer to the storage medium of the local computer.

Yet in one embodiment, the operation of the remote computer further includes the operation of downloading a virus signature file to the local computer.

Further in one embodiment, the operation of downloading the virus signature file further includes the operation of downloading the virus signature file to the memory of the local computer.

Still in one embodiment, the operation of downloading the virus signature file further includes the operation of downloading the virus signature file to the storage medium of the local computer.

Yet in one embodiment, the operation of the remote computer further includes the operation of downloading a virus repair utility program from the remote computer to the local computer.

Further in one embodiment, the operation of downloading the virus repair utility program further includes the operation of downloading the virus repair utility program to the memory of the local computer.

Still in one embodiment, the operation of downloading the virus repair utility program further includes the operation of downloading the virus repair utility program to the storage medium of the local computer.

Still in one embodiment, the operation of the remote computer further includes the operation of executing the virus repair utility program at the local computer.

Further in one embodiment, the operation of executing the virus repair utility program at the local computer further includes the operation of repairing deleted files located at the local computer.

Still in one embodiment, the operation of the remote computer further includes the operation of downloading the virus repair utility program from the remote computer to the storage medium of the local computer.

Still in one embodiment, the operation of the remote computer further includes the operation of monitoring the local computer through the operation of the remote computer.

Yet in one embodiment, the operation of monitoring the local computer further includes the operations of monitoring, writing data to and reading data from the storage medium of the local computer.

Yet in one embodiment, the operation of monitoring the local computer further includes the operation of monitoring the memory of the local computer.

Yet in one embodiment the, operation of monitoring the local computer further includes the operation of monitoring and controlling the appearance of a local display device of the local computer.

Further in one embodiment, the local computer remotely communicates with the remote computer, whereupon remote virus scanning and repair can be performed under the control of the remote computer.

Further in one embodiment, the local computer remotely communicates with the remote computer, whereupon remote virus scanning and repairing can be performed under the control of the local computer.

The present invention also provides a computer program on a storage medium, comprising a bootable virus utility operating program locally operable by a central processing unit of a local computer and independently of a normal operating system of the local computer; and communication program means for establishing communication with a remote computer.

Further in one embodiment, the bootable virus utility operating program further includes a virus scanning utility program.

Further in one embodiment, the bootable virus utility operating program further includes a virus repair utility program.

The present invention also provides a method of remotely scanning and repairing viruses on a local computer comprising the operations of establishing a communications link between a local computer and a remote computer by operation of a virus utility operating program; enabling interaction between the local computer and the remote computer; maintaining access to information resident on the local computer; scanning of viruses contained within the information stored on the local computer; and repairing information infected with viruses on the local computer.

Further in one embodiment, the communications link is established over one of the group consisting of a modem, a local area network, a wide area network and Internet.

The present invention also provides a system for scanning and repairing viruses on a data storage medium, comprising, a local computer associated with the data storage medium, the local computer having a central processor unit, a memory, and a normal operating system; a remote computer; and a bootable virus utility operating program means to be loaded into the memory of the local computer for operating the local computer independently of the normal operating system and to establish communications between the local computer and the remote computer; wherein the virus scanning and repairing at the local computer is remotely controlled by the remote computer so as to perform the virus scanning and repair on the data contained in the local storage medium.

Further in one embodiment, the remote computer has control of the local computer and can access disk storage media and memory of the local computer. One display device is available to the technician operating the remote computer and another display device is available to the user at the local computer. The remote computer queries the local computer user for pertinent user information, including virus scanning options, data recovery options, method of payment, and other like information. Still in one embodiment, the remote computer can upload virus scanning and repair utility programs to the local computer.

These and various other advantages and features of novelty which characterize the invention are pointed out with particularity in the claims annexed hereto and forming a part hereof However, for a better understanding of the invention, its advantages, and the objects obtained by its use, reference should be made to the accompanying drawings and descriptive matter, which form a further part hereof, and in which there is illustrated and described a preferred embodiment of the invention.

BRIEF DESCRIPTION OF THE DRAWINGS

In the drawings wherein corresponding reference numerals generally indicate corresponding parts throughout the several views.

DETAILED DESCRIPTION OF THE PREFERRED EMBODIMENT

In the following description of the exemplary embodiment, reference is made to the accompanying drawings which form a part of hereof, and in which is shown by way of illustration the specific embodiment in which the invention may be practiced. It is to be understood that other embodiments may be utilized as structural changes may be made without departing from the scope of the present invention.

Figure 1:
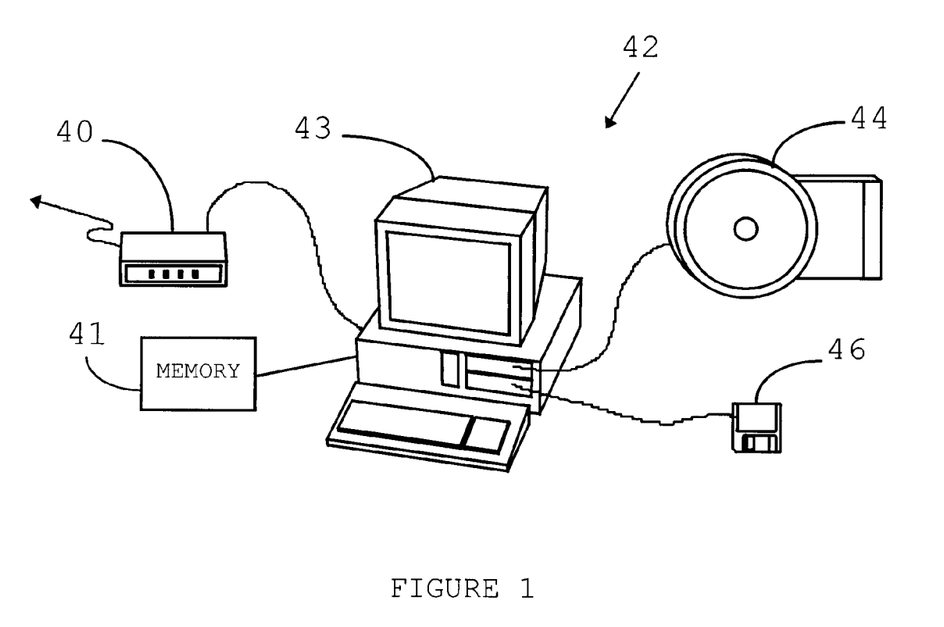
FIG. 1 illustrates a local computer.

FIG. 1 illustrates a local computer 42, a CPU and memory 41 associated with the local computer 42, a modem 40, a hard disk data storage device 44, a display device 43, and a floppy diskette 46. Computer viruses are typically spread via infected floppy diskettes, hard disk drives, or by infected programs downloaded from networks or bulletin board services via the modem. Generally, when a virus infected file is executed, any one of these components may become infected by the virus. The virus will then replicate and spread, each time the infected file is executed, to similar components of other computer systems. It is also appreciated by those skilled in the art that deleted files which are infected with a virus may reside on the floppy diskette 46, the hard disk data storage device 44 or on any other component of the computer system capable of storing files.

If the hard disk data storage device 44 has been damaged and the local computer 42 is unable to boot, a bootable virus utility operating program is loaded from a storage medium to the local computer memory 41. The program then boots up the local computer 42 even if the normal operating system is unable to boot. The storage medium comprises a boot program, a communications program and a virus scanning program containing a virus signature file. It is appreciated by those skilled in the art that a virus repair program may also be included with the other programs on the storage medium. It is also appreciated that the storage medium containing the bootable virus utility operating program may comprise a floppy diskette, a CD-ROM, a separately allocated boot sector of a hard disk drive, a ZIP drive, etc. It is further appreciated that once the local computer 42 boots up, the user may scan for viruses utilizing the virus scanning program contained on the storage medium.

Figure 2:
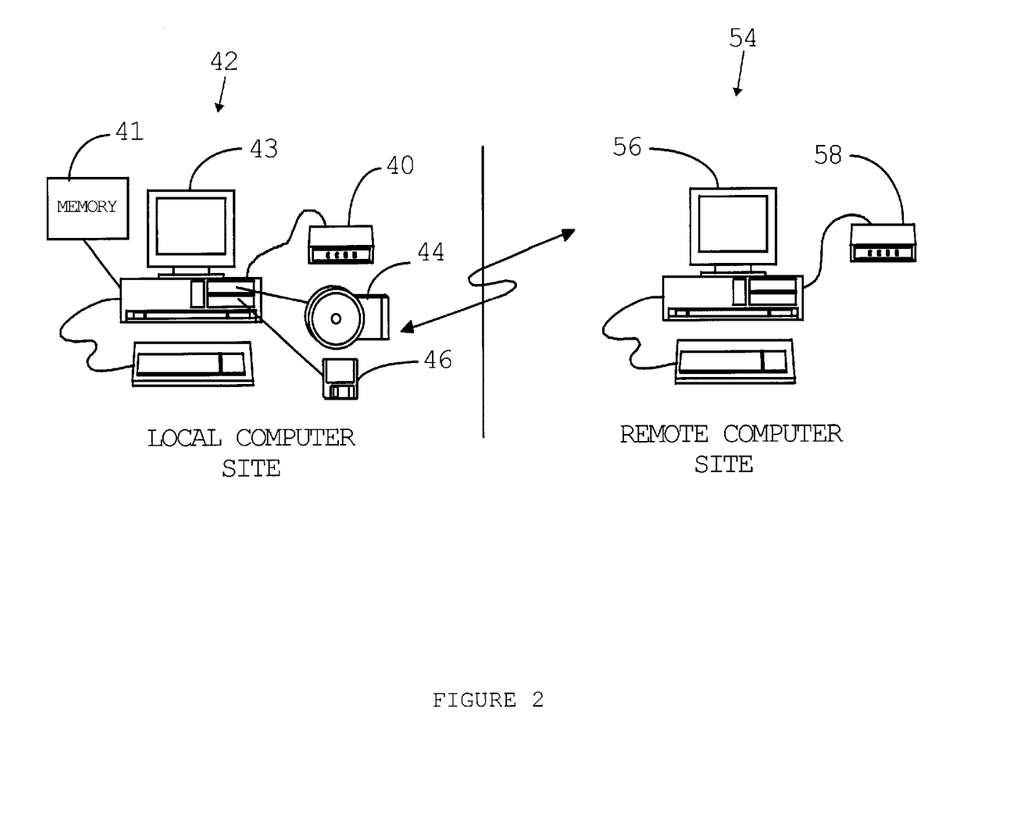
FIG. 2 illustrates the local computer in communication with a remote computer.

If any viruses are detected, the user may then connect to the remote computer utilizing the communications program and communications hardware modem 40. If a communication connection is established, the remote computer takes control of the local computer 42 (FIG. 2) and provides the local user with several service options, comprising: data recovery, virus scanning and virus repair services. It is appreciated that the user may execute the virus scanning program provided on the storage medium prior to connecting with the remote computer 54 (FIG. 2). However, the remote computer 54 (FIG. 2) will generally contain a current, potentially up-to-the-minute, virus signature file for scanning the local computer 42 for the latest viruses and repairing the local computer 42. In addition, if data has been lost on the hard disk drive 44, the local user will have the option of conducting a remote data recovery operation in conjunction with the remote computer 54 (FIG. 2).

FIG. 2 illustrates a diagram of a local computer 42 remotely connected and in communication with a remote computer 54 via communications hardware modems 40 and 58, respectively. A first display 43 being available to a local user and a second display 56 being available to a remote user.

A preferred embodiment of the present invention uses a bootable virus utility operating program to start up the local computer 42 even after having suffered considerable damage to its operating system files or file structures as a result of a computer virus. There are viruses, such as Boot Sector Infectors, that damage the boot sector loader program on a floppy diskette or the master boot record program on a hard disk drive in a computer system. These programs load and execute the operating system for a particular computer system. The terms "bootable", "boot", or "to bootstrap a computer" are used interchangeably and mean to "start" a computer. Their origin comes from an old expression "to pull oneself up from one's own bootstraps" and is a reasonable expression to describe how a computer normally starts up. When a computer boots up, an operating system is the first thing that is copied into the memory circuits of a computer. Data in memory is generally volatile and only exists while there is power available to the memory, and is usually referred to as Random Access Memory (RAM).

One advantage of the preferred embodiment in accordance with the present invention is that the local computer 42 may boot up even if its normal operating system program has been rendered inoperable by a virus or other catastrophic event. In this event, a bootable virus utility operating program comprising virus utility and communications software programs is loaded into the local computer memory 41. It is appreciated by those skilled in the art that the virus utility and communications software programs may be contained in a removable storage medium, e.g. floppy diskette, ZIP drive, CD-ROM etc., or may be contained in a fixed storage medium such as a separately allocated boot sector of a hard disk data storage device 44.

Once the local computer 42 boots up, the user may choose to execute one of several programs contained in the storage medium. The local user may execute a virus scanning program and if one or more viruses are detected on the local computer 42, the user may connect to the remote computer 54. If the local user desires to connect with the remote computer 54, a communications program is invoked by the local user to establish a communications connection between the local computer 42 and the remote computer 54 via the communications hardware modems 40 and 58, respectively. The local computer 42 may dial into the remote computer via a default "800" number, or may be prompted by the bootable virus utility program with a menu of optional numbers for dialing. It is appreciated by those skilled in the art that a priority telephone number may be dialed by the local computer 42. This number being available to preferred customers who pay an extra fee for the priority service.

Once communications is established, the remote computer 54 takes over control of the local computer 42. The local user may then conduct data recovery, virus scanning, or virus repair operations, under the control of the remote computer 54. Once the local user selects a service, a service program is downloaded from the remote computer 54 to the local computer 42, via communications hardware modem 58 and 40, respectively, and stored in the local computer memory 41. Subsequently, the program executes from the memory 41 of the local computer 42.

If the local computer 42 requests virus scanning services, a virus scanning software utility program is downloaded into the local computer memory 41 via communications hardware modems 58 and 40, respectively. In addition, a complete up-to-date virus signature file is downloaded into the local computer memory 41. Downloading the virus scanning software into the local computer memory 41 provides advantages, especially in data recovery applications, because the virus scanning and virus repairing programs may be executed in the local computer memory 41 without having to over-write any data located on the hard disk drive 44. The virus scanning software would also scan files that had been previously deleted and perform virus repair operations accordingly. The virus signature file containing the signatures of the latest known viruses is maintained up-to-date at the remote computer 54. It is appreciated by those skilled in the art that the virus signature file may be downloaded and stored on the local computer hard disk drive 44 or to a removable storage medium, e.g. a floppy diskette 46. Prior to rendering the virus scanning and repair services, the remote computer 54 queries the local user for a method of payment. However, it is appreciated, that if the virus scanning utility program does not find and/or repair any viruses, no fee may be charged for the services rendered, and the remote computer 54 may simply disconnect without querying the local user for actual payment.

If the local user elects to execute a remote a data recovery operation, this operation may be carried out in accordance with applicant's pending applications Ser. Nos. 08/667,956 and 08/877,125, filed Jun. 18, 1996 and Jun. 17, 1997, respectively. The remote data recovery operation service being executed under the control of the remote computer 54. It is appreciated that a data recovery operation will generally be conducted prior to any virus scanning or repair operations for the purpose of recovering any data that may be unavailable as result of a virus infection, or other catastrophic event. Of course, the virus scanning software will also scan files that had been previously deleted and perform virus repair operations accordingly. Conducting virus scan and repair operations subsequent to the data recovery operation ensures that the recovered data is free of viruses.

It is appreciated by those skilled in the art that the local computer 42 may be replaced by a network server or a network of computers while keeping with the spirit of the present invention. In one embodiment, the network server may automatically dial the remote computer 54 via an "800" number during the night hours, establish communications with the remote computer 54, and perform routine virus scanning and disinfection of all the computers comprising the network. It is appreciated to those skilled in the art that the latest virus signature files may be loaded on the network server and then used for scanning the network nodes.

It is also appreciated by those skilled in the art that the remote computer 54 is not limited to a single computer capable of serving a single connection. Remote computer 54 may be replaced with a plurality of computer stations interconnected by a local area network, a file server, a communications server, and an arbitrary network of communications hardware, preferably modems interconnected via a communications switch, such as a PBX.

The bootable virus utility operating program may be distributed at retail software outlets. However, the bootable virus utility operating program may also be obtained and downloaded from Internet or a private computer bulletin board service. More preferably, however, the bootable virus utility operating program may be distributed by an original equipment manufacturer of computers, thus making the bootable virus utility operating program available as part of a bundled software package in the form of a removable storage medium and/or in a separately allocated partition of a hard disk drive where it would be safe to boot the computer in case of a virus infection. However, it is appreciated that the bootable virus utility program may be distributed for free and payment rendered when remote data recovery and/or remote virus scan and repair services are provided by the remote computer 54.

Further, in a preferred embodiment, the present invention also provides an automated monthly subscription service where the user obtains an access code with several potential access methods available. One method requiring booting and remote connection via a storage medium when the local operating program is not functioning and the other method occurring when the normal operating program of the local computer 42 functions properly and does not require the booting feature. Each method comprising a local virus utility program a s well as a remote, up-to-date, virus utility program including the latest virus signature file.

Figure 3:
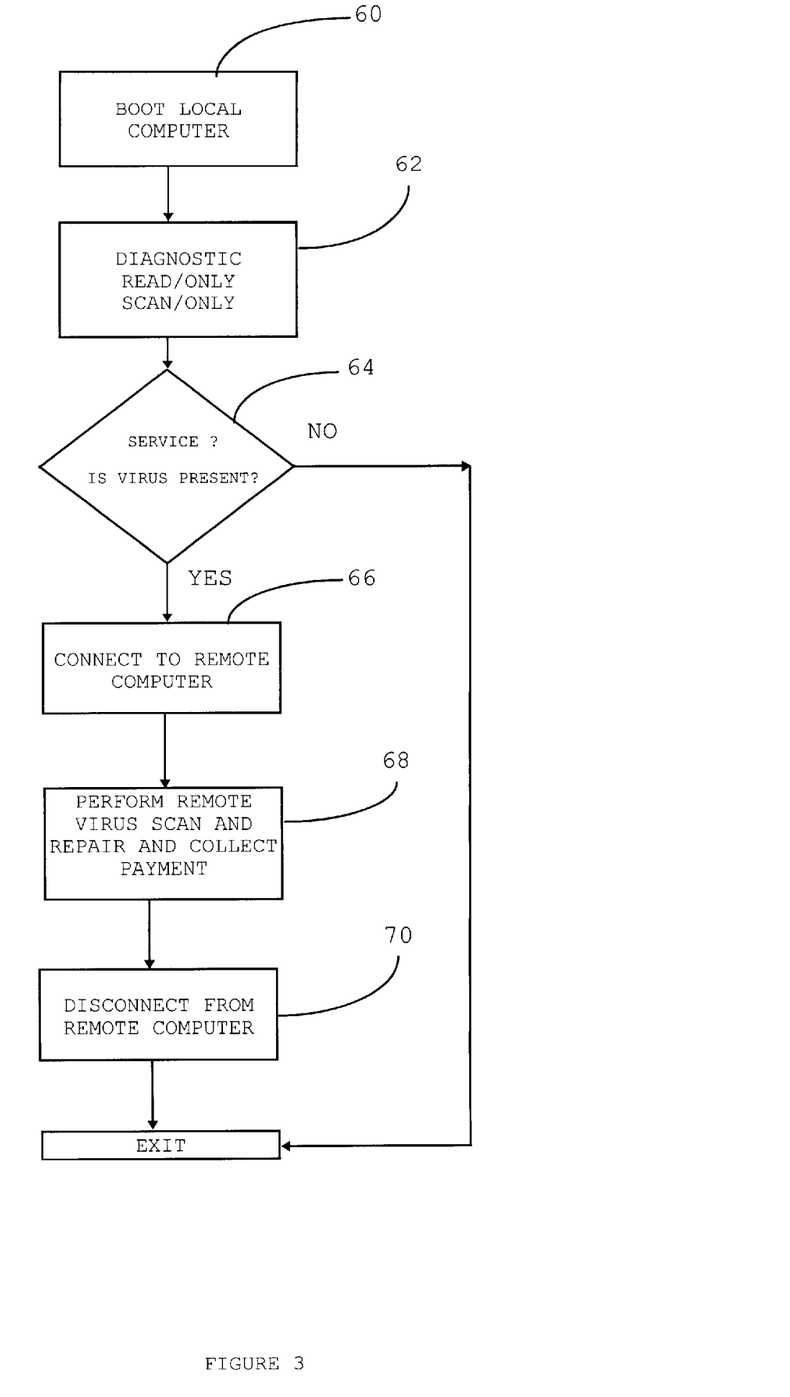
FIG. 3 illustrates a flow diagram of the virus scanning and repair method in accordance with the principles of the present invention.

FIG. 3 illustrates a flow diagram of the remote virus scanning and repair method according to the present invention. The local computer 42 (FIG. 2) is booted using the bootable virus utility operating program at operation 60. The local computer 42 (FIG. 2) now runs under the virus utility operating program independently of the normal operating program and is under the local user's control. At operation 62 the local user may execute a read only, scan only, virus scanning program contained in the storage medium along wit h the bootable virus utility operating program.

Further in FIG. 3, if at operation 62, any viruses re detected on the local computer 42 (FIG. 2), the user may be prompted to utilize the remote virus scanning and repair service under the control of the remote computer 54 (FIG. 2), operation 64. If service is not requested, the local user may simply exit the program. If service is requested, the local user invokes the communications program to establish a communication connection with the remote computer 54 (FIG. 2), operation 66. Upon establishing a communication connection the remote computer 54 (FIG. 2) takes over the operation of the local computer 42 (FIG. 2) and the remote computer 54 (FIG. 2) performs the remote virus scanning and virus repair, operation 68. The remote computer 54 (FIG. 2) sends the program associated with the virus scanning and repair service requested as well as an up to date virus signature file to the local computer memory 41 and subsequently executes the program to scan and repair the local computer of any viruses using an up-to-date virus signature file. Payment for services is also transacted with the local user at operation 68. Upon completion of the payment transaction, the remote computer 54 (FIG. 2) disconnects the communication link with the local computer 42 (FIG. 2), operation 70.

The above specification, examples and data provide a detailed description of various embodiments in accordance with the present invention.

We claim:

1. A method of remotely scanning for and repairing viruses on a local computer having an operating system, the method comprising the operations of:
   providing a bootable virus utility operating program at the local computer, the bootable virus utility operating program including a boot program and a communications program;
   booting the local computer independently of the operating system using the boot program of the bootable virus utility operating program if the operating system is unable to boot; and
   establishing communications between the local computer and a remote computer using the communications program of the bootable virus utility operating program.

2. A method in accordance with claim 1, wherein the operation of the bootable virus utility operating program further includes the operation of executing a virus scanning program.

3. A method in accordance with claim 2, wherein the operation of the bootable virus utility operating program further includes the operation of executing a virus repair program.

4. A method in accordance with claim 1, wherein the operation of the local computer is controlled by the remote computer.

5. A method in accordance with claim 4, further including the operation of querying a local computer user for information through the operation of the remote computer.

6. A method in accordance with claim 5, further including the operations of downloading a remote data recovery program from the remote computer to the memory of the local computer and executing the remote data recovery program in the memory of the local computer.

7. A method in accordance with claim 5, further including the operation of downloading a virus scanning utility program from the remote computer to the local computer.

8. A method in accordance with claim 7, wherein the virus scanning utility program is downloaded from the remote computer to the memory of the local computer.

9. A method in accordance with claim 8, further including the operation of executing the virus scanning utility program at the local computer.

10. A method in accordance with claim 9, wherein the operation of executing the virus scanning utility program at the local computer further includes the operation of scanning deleted files located at the local computer.

11. A method in accordance with claim 7, wherein the virus scanning utility program is downloaded from the remote computer to the storage medium of the local computer.

12. A method in accordance with claim 5, further including the operation of downloading a virus signature file to the local computer.

13. A method in accordance with claim 12, further including the operation of downloading the virus signature file to the memory of the local computer.

14. A method in accordance with claim 12, further including the operation of downloading the virus signature file to the storage medium of the local computer.

15. A method in accordance with claim 5, further including the operation of downloading a virus repair utility program from the remote computer to the local computer.

16. A method in accordance with claim 15, wherein the virus repair utility program is downloaded from the remote computer to the memory of the local the local computer.

17. A method in accordance with claim 16, further including the operation of executing the virus repair utility program at the local computer.

18. A method in accordance with claim 17, wherein the operation of executing the virus repair utility program at the local computer further includes the operation of repairing deleted files located at the local computer.

19. A method in accordance with claim 17, wherein the virus repair utility program is downloaded from the remote computer to the storage medium of the local computer.

20. A method in accordance with claim 4, further including the operation of monitoring the local computer through the operation of the remote computer.

21. A method in accordance with claim 20, wherein the operation of monitoring the local computer further includes the operations of monitoring, writing data to and reading data from the storage medium of the local computer.

22. A method in accordance with claim 20, wherein the operation of monitoring the local computer further includes the operation of monitoring the memory of the local computer.

23. A method in accordance with claim 20, wherein the operation of monitoring the local computer further includes the operation of monitoring and controlling the appearance of a local display device of the local computer.

24. A method in accordance with claim 1, wherein the local computer remotely communicates with the remote computer, whereupon remote virus scanning and repair can be performed under the control of the remote computer.

25. A method in accordance with claim 1, wherein the local computer remotely communicates with the remote computer, whereupon remote virus scanning and repairing can be performed under the control of the local computer.

26. A bootable virus utility operating program on a storage medium being operated locally by a local computer and independently of an operating system of the local computer, comprising:
  a boot program on the storage medium for booting up the local computer independently of the operating system if the operating system is unable to boot; and
  a communication program on the storage medium for establishing communication between a remote computer and the local computer.

27. A computer program on a storage medium in accordance with claim 26, further comprising a virus scanning utility for scanning virus at the local computer.

28. A computer program on a storage medium in accordance with claim 26, further comprising a virus repair utility for repairing virus infected files at the local computer.

29. A method of remotely scanning and repairing viruses on a local computer having an operating system, comprising the operations of:
  providing a bootable virus utility operating program at the local computer, the bootable virus utility operating program including a boot program and a communications program;
  booting the local computer, independently of the operating system, using the boot program of the bootable virus utility operating program if the operating system is unable to boot;
  establishing a communications link between the local computer and a remote computer using the communications program of the bootable virus utility operating program;
  enabling interaction between the local computer and the remote computer;
  maintaining access to information resident on the local computer;
  scanning viruses contained within the information stored on the local computer; and
  repairing information infected with viruses on the local computer.

30. The method of claim 29, wherein the communications link is established over one of the group consisting of a modem, a local area network, a wide area network and Internet.

31. A system for scanning and repairing viruses on a data storage medium, comprising:
  a local computer associated with the data storage medium, the local computer having a central processor unit, a memory, and an operating system;
  a remote computer; and
  a bootable virus utility operating program means to be loaded into the memory of the local computer for operating the local computer independently of the operating system and to establish communications between the local computer and the remote computer, the bootable virus utility operating program means comprises a boot program and a communications program on a storage medium;
  wherein the virus scanning and repairing at the local computer is remotely controlled by the remote computer so as to perform the virus scanning and repair on the data contained in the local storage medium.

32. A method operable on a local computer having an operating system, comprising the operations of:
  loading into a memory of the local computer an operating program, the operating program having a boot program and a communications program and being operated locally by the local computer and independently of the operating system;
  booting the local computer through the operation of the boot program of the loaded operating program by the local computer; and
  establishing communication between the local computer and a remote computer through the operation of the communications program of the loaded operating program by the local computer.

33. The method in accordance with claim 32, further comprising an operation of scanning viruses through the operation of the loaded operating program.

34. The method in accordance with claim 32, further comprising an operation of deleting the viruses through the operation of the loaded operating program.

35. The method in accordance with claim 34, further comprising an operation of recovering virus-infected data through the operation of the loaded operating program.

36. The method in accordance with claim 32, further comprising an operation of recovering virus-infected data through the operation of the loaded operating program.

37. A system, comprising:
  a local computer associated with a data storage medium, the local computer having a central processor unit, a memory, and an operating system;

a remote computer; and an operating program including a boot program and a communications program to be loaded into the memory of the local computer for operating the local computer independently of the operating system and to establish communication between the local computer and the remote computer.

38. The system of claim 37, further comprising a virus scanning program for scanning viruses through the operation of the loaded operating program.

39. The system of claim 37, further comprising a virus deleting program for deleting the viruses through the operation of the loaded operating program.

40. The system of claim 39, further comprising a data recovery program for recovering virus-infected data through the operation of the loaded operating program.

41. The system of claim 37, further comprising a data recovery program for recovering virus-infected data through the operation of the loaded operating program.

\* \* \* \* \*

UNITED STATES PATENT AND TRADEMARK OFFICE
CERTIFICATE OF CORRECTION

PATENT NO. : 6,347,375 B1 Page 1 of 1
DATED : February 12, 2002
INVENTOR(S) : Reinert et al.

It is certified that error appears in the above-identified patent and that said Letters Patent is hereby corrected as shown below:

Column 3,
Line 1, "burdonsome" should read -- burdensome --

Column 11,
Line 9, "the local the local" should read -- the local --

Column 14,
Line 7, "claim 37" should read -- claim 39 --

Signed and Sealed this

Twenty-first Day of January, 2003

JAMES E. ROGAN
*Director of the United States Patent and Trademark Office*